(12) United States Patent
Biran

(10) Patent No.: US 11,991,283 B2
(45) Date of Patent: May 21, 2024

(54) ACCELERATED EXECUTION OF APPLICATIONS WITH FULLY HOMOMORPHICALLY ENCRYPTED INPUT DATA

(71) Applicant: NITROMIA LTD., Tel Aviv (IL)

(72) Inventor: Gera Biran, Beit Zait (IL)

(73) Assignee: Nitromia Ltd., Tel Aviv (IL)

( * ) Notice: Subject to any disclaimer, the term of this patent is extended or adjusted under 35 U.S.C. 154(b) by 286 days.

(21) Appl. No.: 17/615,869

(22) PCT Filed: Jun. 4, 2020

(86) PCT No.: PCT/IL2020/050626
§ 371 (c)(1),
(2) Date: Dec. 2, 2021

(87) PCT Pub. No.: WO2020/245829
PCT Pub. Date: Dec. 10, 2020

(65) Prior Publication Data
US 2022/0286285 A1    Sep. 8, 2022

Related U.S. Application Data

(60) Provisional application No. 62/857,338, filed on Jun. 5, 2019.

(51) Int. Cl.
*H04L 9/14* (2006.01)
*H04L 9/00* (2022.01)

(52) U.S. Cl.
CPC ............... *H04L 9/14* (2013.01); *H04L 9/008* (2013.01)

(58) Field of Classification Search
CPC . H04L 9/30; H04L 9/50; H04L 9/0825; H04L 9/3093; H04L 9/085; H04L 2209/46; H04L 63/0428; H04L 9/008; G06F 21/6245; G06F 21/602
See application file for complete search history.

(56) References Cited

U.S. PATENT DOCUMENTS

| | | | |
|---|---|---|---|
| 7,440,995 B2 * | 10/2008 | Morgan, III | G06F 9/445 709/227 |
| 10,289,816 B1 * | 5/2019 | Malassenet | G06F 21/14 |
| 11,616,635 B2 * | 3/2023 | Blatt | H04L 9/008 380/28 |
| 2002/0036998 A1 * | 3/2002 | Lomp | H04B 1/7075 375/E1.006 |

(Continued)

*Primary Examiner* — Ninos Donabed
(74) *Attorney, Agent, or Firm* — Rivka Friedman

(57) ABSTRACT

A method of executing a program segment operating on homomorphically encrypted data, the method comprising: providing a processing and memory circuitry (PMC) configured to execute, responsive to a respective program instruction, at least: i) a move operation, and ii) an operation of comparing two homomorphically encrypted input bits; executing, on the PMC, responsive to instructions of the program segment: i) a first operation of comparing two homomorphically encrypted bits to store a comparison result to a first memory location, and ii) a second operation that is configured to access the first memory location; thereby giving rise to branch-free execution of a program segment in accordance with the comparison result of homomorphically encrypted bits.

9 Claims, 7 Drawing Sheets

(56) References Cited

U.S. PATENT DOCUMENTS

| | | | |
|---|---|---|---|
| 2007/0289006 A1* | 12/2007 | Ramachandran | H04L 63/08 726/10 |
| 2008/0082079 A1* | 4/2008 | Braga | A61M 25/0026 604/523 |
| 2014/0233727 A1* | 8/2014 | Rohloff | G06F 16/3347 380/28 |
| 2016/0156595 A1* | 6/2016 | Wu | H04L 9/008 713/168 |
| 2017/0004324 A1* | 1/2017 | Seo | H04L 9/008 |
| 2018/0232320 A1* | 8/2018 | Raval | G06F 12/1081 |
| 2018/0352479 A1* | 12/2018 | Dutta | H04W 28/26 |
| 2019/0036678 A1* | 1/2019 | Ahmed | H04L 9/008 |
| 2019/0253431 A1* | 8/2019 | Atanda | G06F 21/62 |
| 2019/0386814 A1* | 12/2019 | Ahmed | H04L 9/008 |
| 2020/0089919 A1* | 3/2020 | Courousse | G06F 21/755 |
| 2020/0136797 A1* | 4/2020 | Yu | H04L 9/008 |
| 2021/0119766 A1* | 4/2021 | Suresh | G06F 7/552 |
| 2021/0160048 A1* | 5/2021 | Blatt | H04L 9/008 |
| 2021/0250163 A1* | 8/2021 | Vald | H04L 9/008 |
| 2022/0308755 A1* | 9/2022 | Ng | G06F 9/45558 |
| 2022/0308756 A1* | 9/2022 | Raval | G06F 3/061 |

\* cited by examiner

| Input1 | Input2 | XOR(In1,In2) | 1-XOR(In1,In2) |
|---|---|---|---|
| 0 | 0 | 0 | 1 |
| 0 | 1 | 1 | 0 |
| 1 | 0 | 1 | 0 |
| 1 | 1 | 0 | 1 |

Mov [R$_i$], e(0)
Mov [R$_j$], e(1)
Mov R$_k$, [R$_i$]

Fig. 7B

Mov [R$_i$], e(1)
Mov [R$_j$], e(0)
Mov R$_k$, [R$_i$]

ACCELERATED EXECUTION OF APPLICATIONS WITH FULLY HOMOMORPHICALLY ENCRYPTED INPUT DATA

TECHNICAL FIELD

The presently disclosed subject matter relates to data encryption, and in particular to implementation of systems for processing encrypted data.

BACKGROUND

Problems of implementation in systems for handling encrypted data have been recognized in the conventional art and various techniques have been developed to provide solutions.

General Description

According to one aspect of the presently disclosed subject matter there is provided a method of executing a program segment operating on homomorphically encrypted data, the method comprising:
  providing a processing and memory circuitry (PMC) configured to execute, responsive to a respective program instruction, at least:
    i) a move operation, and
    ii) an operation of comparing two homomorphically encrypted input bits, the operation giving rise to storage of an encrypted binary output digit to a memory location, in accordance with whether unencrypted bits corresponding to the encrypted input bits are equal;
  executing, on the PMC, a responsive to instructions of the program segment:
    i) a first operation of comparing two homomorphically encrypted bits to store a comparison result to a first memory location, and
    ii) a second operation that is configured to access the first memory location;
  thereby giving rise to branch-free execution of a program segment in accordance with the comparison result of homomorphically encrypted bits.

In addition to the above features, the method according to this aspect of the presently disclosed subject matter can comprise one or more of features (i) to (v) listed below, in any desired combination or permutation which is technically possible:
  (i) the operation of comparing is one-minus-XOR.
  (ii) bits are homomorphically encrypted in accordance with Dijk, Gentry, Halevi and Vaikuntanathan (DGHV) encryption.
  (iii) the bits are homomorphically encrypted in accordance with Pailler encryption.
  (iv) the bits are homomorphically encrypted in accordance with DGHV and subsequently encrypted with in accordance with Pailler.
  (v) the second operation is selected from a group comprising: the move operation, and the homomorphic comparison operation.

According to another aspect of the presently disclosed subject matter there is provided a system of executing a program segment operating on homomorphically encrypted data, the system comprising:
  a processing and memory circuitry (PMC) configured to execute, responsive to a respective program instruction, at least:
    i) a move operation, and
    ii) an operation of comparing two homomorphically encrypted input bits, the operation giving rise to storage of an encrypted binary output digit to a memory location, in accordance with whether unencrypted bits corresponding to the encrypted input bits are equal,
  the PMC comprising a program segment, the program segment comprising instructions to:
    i) execute a first operation of comparing two homomorphically encrypted bits to store a comparison result to a first memory location, and
    ii) execute a second operation that is configured to access the first memory location;
      thereby giving rise to branch-free execution of a program segment in accordance with the comparison result of homomorphically encrypted bits.

This aspect of the disclosed subject matter can comprise one or more of features (i) to (v) listed above with respect to the system, mutatis mutandis, in any desired combination or permutation which is technically possible.

The system according to this aspect of the presently disclosed subject matter can comprise the additional feature:
  (vi) the program segment comprises further instructions to:
    i) move an encrypted 1 to a memory location denoted by a first register;
    ii) move an encrypted 0 to a memory location denoted by a second register; and
    iii) move the data contained in the memory location denoted by the second register to a comparison result memory location.

According to another aspect of the presently disclosed subject matter there is provided a non-transitory program storage device readable by a computer, tangibly embodying computer readable instructions executable by the computer to perform a method of executing a software program operating on homomorphically encrypted data, the method comprising:
  i) executing a first operation of comparing two homomorphically encrypted bits to store a comparison result to a first memory location, and
  ii) executing a second operation that is configured to access the first memory location;
  thereby giving rise to branch-free execution of a program segment in accordance with the comparison result of homomorphically encrypted bits,
  wherein the executing is performed on a MOV machine emulation configured to execute, responsive to a respective MOV machine program instruction of a MOV machine program segment, at least:
    i) a move operation, and
    ii) an operation of comparing two homomorphically encrypted input bits, the operation giving rise to storage of an encrypted binary output digit to a memory location, in accordance with whether unencrypted bits corresponding to the encrypted input bits are equal.

This aspect of the disclosed subject matter can comprise one or more of features (i) to (vi) listed above with respect to the system, mutatis mutandis, in any desired combination or permutation which is technically possible.

BRIEF DESCRIPTION OF THE DRAWINGS

Various embodiments are herein described, by way of example only, with reference to the accompanying drawings, wherein:

FIG. 2 is an illustration of a definition of a boolean 1-Minus-XOR operation, according to some embodiments of the presently disclosed subject matter;

FIGS. 7A and 7B, are alternatives used in an example method for performing comparison of two memory locations using only MOV.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "encrypting", "decrypting", "determining", "calculating", "receiving", "providing", "obtaining", "emulating" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
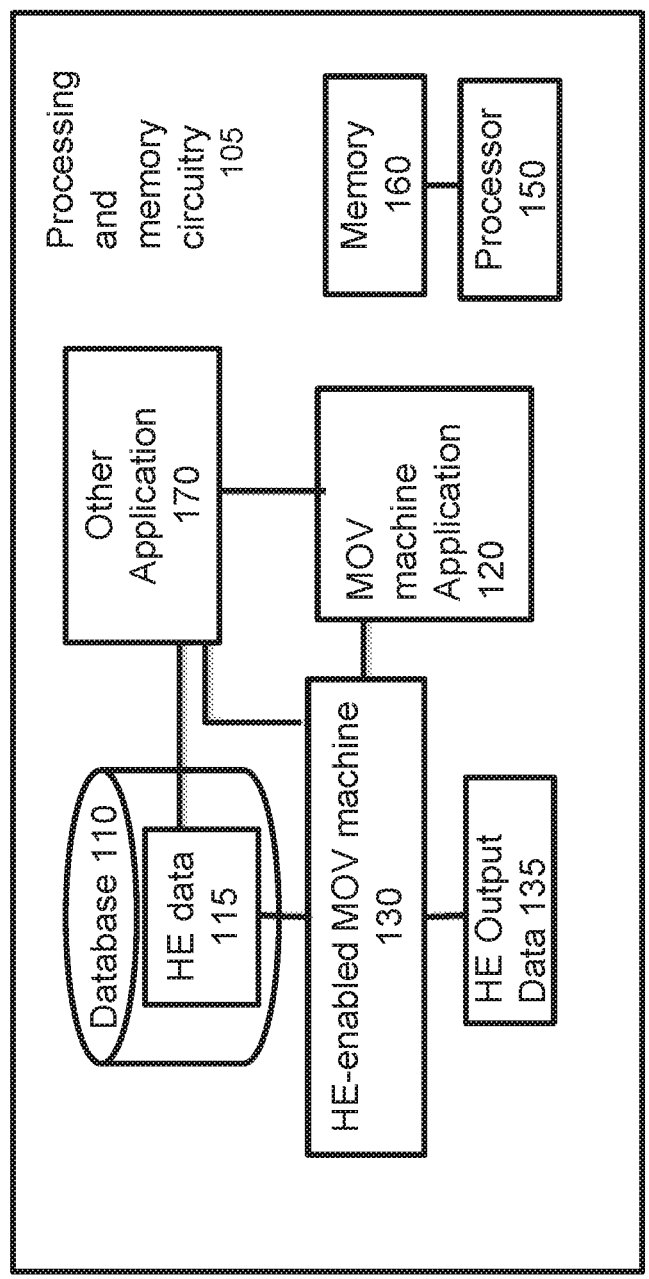
FIG. 1 is an example system operating on homomorphically encrypted data.
according to some embodiments of the presently disclosed subject matter.

Bearing this in mind, attention is now directed to FIG. 1, which illustrates an example system operating on homomorphically encrypted data, according to some embodiments of the presently disclosed subject matter.

The term "Partially homomorphic encryption" (PHE) refers to a group of encryption methods that include schemes which support the evaluation of circuits consisting of only one type of gate, e.g., addition or multiplication.

The term "Fully Homomorphic Encryption" (FHE) refers to encryption methods that support both addition and multiplication.

DGHV (Van Dijk, Gentry, Halevi and Vaikuntanathan) is an FHE method. Pailler is a PHE method.

PHE, FHE, and DGHV are described in literature known in the art, such as the following references:
https://en.wikipedia.org/wiki/Homomorphic_encryption
https://en.wikipedia.org/wiki/Homomorphic_encryption#Partially_homomorphic_cryptosystems
https://eprint.iacr.org/2009/616.pdf in the DGHV method:
the encryption/decryption key is an odd integer, chosen from some interval $p \in [2\eta-1, 2\eta)$.
Encryption is defined by a function Encrypt(p, m), where is a plaintext bit
To encrypt a bit $m \in \{0, 1\}$, the ciphertext is set to an integer whose residue (i.e. mod p) has the same parity as the plaintext.
Specifically:

$$c = pq + 2r + m$$

where the integers q, r are chosen at random in some other prescribed intervals, such that 2r is smaller than p/2 in absolute value.

Decryption is defined by a function Decrypt(p, c):

$$(c \bmod p) \bmod 2.$$

DGHV homomorphic addition operates as follows:
Let:

$$c1 = q1 \cdot p + 2r1 + m1$$

$$c2 = q2 \cdot p + 2r2 + m2$$

Then:

$$c1 + c2 = q0 \cdot p + 2r0 + m1 + m2$$

$$(q1 + q2 == q0, r1 + r2 == r0)$$

$c1 + c2$ is an encryption of $m1 + m2 \bmod 2 == m1 \oplus m2$

DGHV supports homomorphism of the XOR operation i.e.

$$[0] \oplus [0] == [0]$$

$$[0] \oplus [1] == [1]$$

$$[1] \oplus [0] == [1]$$

$$[1] \oplus [1] == [0]$$

(where [num]) denotes a DGHV-encrypted number)

In some embodiments of the presently disclosed subject matter, there is provided a system of executing applications on FHE/PHE encrypted data (for example: databases) without decrypting the data beforehand.

For example, an application could group patient records of a health database into a number of subsets based on matching the values of the encrypted "age" field in the patient record to encrypted constant values.

Data encrypted with a homomorphic encryption method (whether FHE or PHE) is hereforward termed homomorphically encrypted (HE) data. In some embodiments, the system is implemented using a processing and memory circuitry (PMC) 105 including a processor 150 and memory 160.

Processor 150 can be a suitable hardware-based electronic device with data processing capabilities, such as, for example, a general purpose processor, digital signal processor (DSP), a specialized Application Specific Integrated Circuit (ASiC), one or more cores in a multicore processor etc. Processor 150 can also consist, for example, of multiple processors, multiple ASICs, virtual processors, combinations thereof etc.

A memory 160 can be, for example, a suitable kind of volatile or non-volatile storage, and can include, for example, a single physical memory component or a plurality of physical memory components. Memory 160 can also include virtual memory. Memory 160 can be configured to, for example, store various data used in computation.

As will be further detailed hereinbelow with reference to FIGS. 3-4, processor 150 can be configured to execute several functional modules in accordance with computer-readable instructions implemented on a non-transitory computer-readable storage medium. Such functional modules are referred to hereinafter as comprised in the processor. These modules can include, for example, HE-enabled MOV machine 130, MOV machine application 120, other application 170, and database 110.

PMC 105 can be located in, for example, a cloud environment such as a public cloud, private cloud, hybrid cloud etc.

Database 110 can be any type of suitable database for storing application data. Database 110 can include HE data 115. HE data 115 can be sensitive data such as, for example, health data or banking data. HE data 115 can result, for example, from performing encryption of sensitive data in a private non-cloud computer system and uploading the resulting encrypted data to the cloud.

HE data 115 can be encrypted, for example, using FHE encryption such as DGHV, or PHE encryption such as Pailler. HE data can also be encrypted, for example, first using FHE encryption such as DGHV and then subsequently using a PHE method such as Pailler.

In some embodiments, the HE data 115 can be encrypted using another homomorphic encryption scheme that supports both a homomorphic addition operation and replacement of indirect indexing. In certain embodiments, the HE data 115 is encrypted using DGHV (for which the homomorphic encryption operation is addition modulo 2 i.e. binary xor—and the multiplication operation is not utilized). In certain embodiments, the HE data 115 is encrypted using inflated bit DGHV, in which the base is a number other than 2, so that encryption is denoted by pq+base*r+m, and decryption is denoted by: (c % p) % base.

Generally speaking, a MOV machine is a model of a computer processor which consists only of a single instruction: MOV—i.e. a "move" instruction for moving data from one register or memory location to another register or memory location.

"Mov is Turing complete" (Dolan, Steven—http://drwho.virtadpt.net/files/mov.pdf) describes an example MOV machine in detail. The term "memory location" as used hereinbelow refers to either a register or a location in a type of memory.

In some embodiments of the presently disclosed subject matter, performing processing of HE data 115 using a MOV machine has advantages in comparison to executing the application using conventional methods, including the following:

MOV machine code provides full Turing machine functionality but does not utilize branches or go-to operations. This enables code which operates on HE data to perform the equivalent of conditional execution even when the result of the homomorphic condition evaluation is encrypted (as will be described below).

By utilizing MOV only, multiplication can be performed using only addition operations.

This improves performance of the FHE, as addition operations generate less noise.

Moreover, an PHE cipher such as Pailler can now be used to provide full application functionality.

A prior art MOV machine (for example as described in Dolan cited above) has the following deficiency for operating on HE data:

The comparison operation as conducted MOV (described below with reference to FIG. 6) compares plaintext data and is not effective in comparison of encrypted data.

HE-enabled MOV machine 130 is an implementation (by way of non-limiting example: a software implementation hereforward termed a MOV machine emulator) of a MOV machine that has the following characteristics:

In some embodiments, this MOV machine is "binary" in the sense that it operates on single bit inputs and single bit outputs i.e. each memory location and register contains a single bit.

In some embodiments, HE-Enabled MOV machine 130 supports, in addition to MOV, an operation that calculates a homomorphic comparison of two encrypted input bits. In this context, the term "operation" also includes a series or combination of operations. In some embodiments, the homomorphic comparison operation generates an encrypted 1 if the unencrypted binary digits corresponding to the two encrypted inputs are equivalent.

For example, HE-Enabled MOV machine 130 can support 1-Minus-XOR (described below) of its two bit inputs. can be, by way of non-limiting example, a software implementation of a MOV machine (i.e. MOV machine emulator). By way of non-limiting example: an initializer software component (not shown) can load HE data 115 into memory, and begin to execute MOV program instructions as listed sequentially in MOV machine application 120.

More specifically: processing and memory circuitry 105 (for example: HE-enabled MOV machine 130 HE-enabled MOV machine 130) can be configured to execute, responsive to (for example), a respective program instruction, at least:

i) a move operation ii) an operation of comparing two homomorphically encrypted input bits, and storing the result (i.e. an encrypted 0 or encrypted1 representing whether the unencrypted bits represented by the encrypted input bits are equal) to a memory location In some embodiments, processing and memory circuitry 105 (for example: HE-enabled MOV machine 130) supports only these 2 operations i.e. the move (i.e. MOV) instruction/operation and the instruction/operation of comparing two homomorphically encrypted input bits.

In some other embodiments, processing and memory circuitry 105 (for example: HE-enabled MOV machine 130) supports additional instructions/operations.

MOV machine application 120 can be an executable file, script file etc. that is adapted to run on HE-enabled MOV machine 130. MOV machine application 120 can operate on HE data 115 from database 110. For example, MOV machine application 120 could group patient records of a health database into a number of subsets based on matching the values of the encrypted "age" field in the patient record to encrypted constant values. MOV machine application 120 can be a non-branching application i.e. its instructions do not include branches or go-tos.

In some embodiments, HE-enabled MOV machine 130 and MOV machine application 120 can be implemented as a single unit (e.g. a single software module).

HE output data 135 denotes the homomorphically-encrypted data that is output by, for example HE-enabled MOV machine 130.

It is noted that the teachings of the presently disclosed subject matter are not bound by the interactive instruction system and subject guidance systems described with reference to FIG. 1. Equivalent and/or modified functionality can be consolidated or divided in another manner and can be implemented in any appropriate combination of software with firmware and/or hardware and executed on a suitable device. The interactive instruction system and subject guidance systems can each be a standalone entity, or integrated, fully or partly, with other entities—via a network or other means.

Attention is directed to FIG. 2, which illustrates a definition of a boolean 1-Minus-XOR operation, according to some embodiments of the presently disclosed subject matter. As described above—in some embodiments—this operator generates an encrypted 1 if the unencrypted bits corresponding to the operator's inputs bits are equal, and an encrypted 0 otherwise. It is noted that each DGHV addition is equivalent to binary XOR, and thus that 1 minus binary XOR is a comparison circuit.

Figure 3:
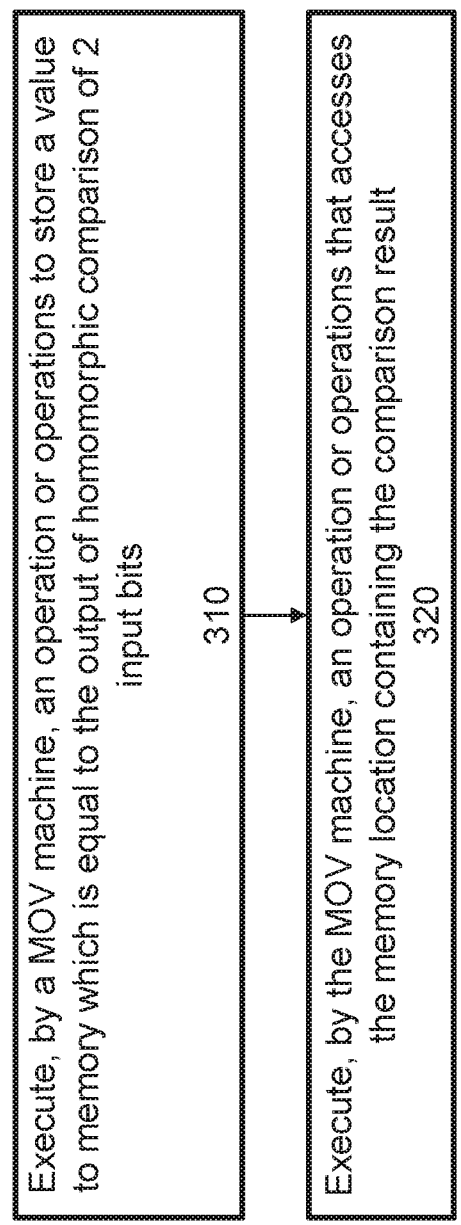
FIG. 3 is a flow diagram of an example method for conditional program action responsive to an outcome of homomorphic comparison of two encrypted input bits, according to some embodiments of the presently disclosed subject matter.

Attention is directed to FIG. 3, which illustrates a flow diagram of an example method for conditional program action responsive to an outcome of homomorphic comparison of two encrypted input bits, according to some embodiments of the presently disclosed subject matter.

It is noted that this method can be used in executing program instructions of the mov machine application 120. A sequence of program instructions (e.g. in mov machine application 120) is herein termed a program segment.

In some embodiments, the method described in FIG. 3 utilizes, for example, a MOV machine supporting an instruction or instructions for homomorphic comparison of 2 encrypted input bits, as described above, with reference to FIG. 1. The method can begin by providing a PMC configured to perform the MOV machine functions as described above, with reference to FIG. 1.

The PMC 105 (for example: MOV machine 130) can execute (310) an operation to store a value to memory which is equal to the output of homomorphic comparison of two input bits.

In some embodiments, PMC 105 (for example: MOV machine 130) executes the operation responsive to a program instruction (or program instructions). In some embodiments the program instruction(s) is/are part of a program segment of MOV machine application 120 (standalone or integrated with MOV machine 130).

In some embodiments, the operation for homomorphic comparison of 2 encrypted input bits is in accordance with the 1-minus-XOR operation as described above.

The PMC 105 (for example: MOV machine 130) can next execute (330), a second operation or operations that accesses the memory location containing the comparison result (i.e. the encrypted 1 or encrypted 0 resulting from the homomorphic comparison operation).

In some embodiments, PMC 105 (for example: MOV machine 130) executes the second operation responsive to a program instruction (or program instructions). In some embodiments the program instruction(s) is/are part of a program segment of MOV machine application 120 (standalone or integrated with MOV machine 130).

In some embodiments, the second operation can be one of a group comprising: the move operation (i.e. MOV), and the homomorphic comparison operation.

It is noted that the teachings of the presently disclosed subject matter are not bound by the flow diagram illustrated in FIG. 3. It is further noted that whilst the flow chart is described with reference to elements of the systems of FIG. 1, this is by no means binding, and the operations can be performed by elements other than those described herein.

Figure 4:
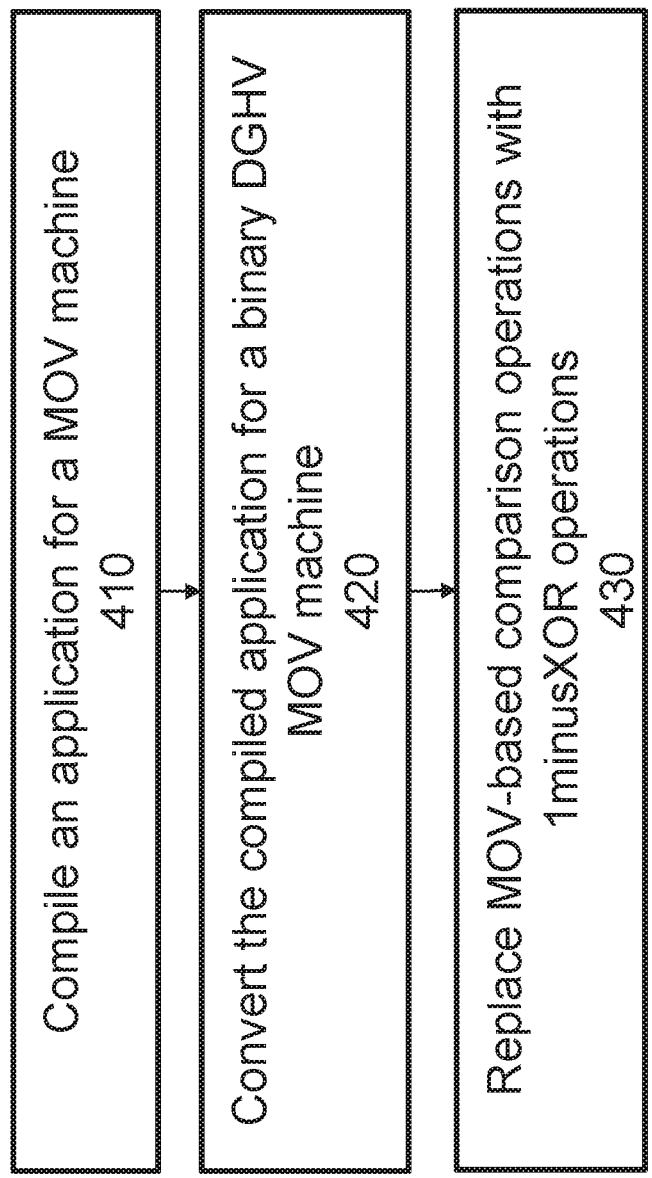
FIG. 4 is an example flow diagram of an example method of creating executable program instructions for HE-enabled Mov machine, according to some embodiments of the presently disclosed subject matter.

Attention is now directed to FIG. 4, which illustrates an example flow diagram of an example method of creating executable program instructions for HE-enabled Mov machine 130—from, for example, application source code written in a high level language such as, for example, C or Python—according to some embodiments of the presently disclosed subject matter.

The method can be performed by, for example, a compiler program or a shell script that invokes programs such as compiler programs. The method can be utilized to create of MOV machine application 120.

First, the compiler can compile (410) a Turing complete specific language code (C, Python, etc. . . . ) to MOV commands.

Next, the compiler can compile (420) all data to binary DGHV.

Finally, the compiler can replace (430) MOV-based comparison operations with homomorphic comparison (e.g. 1-Minus-XOR) operations.

It is noted that the teachings of the presently disclosed subject matter are not bound by the flow diagram illustrated in FIG. 3. It is further noted that whilst the flow chart is described with reference to elements of the systems of FIG. 1, this is by no means binding, and the operations can be performed by elements other than those described herein.

Figure 5:
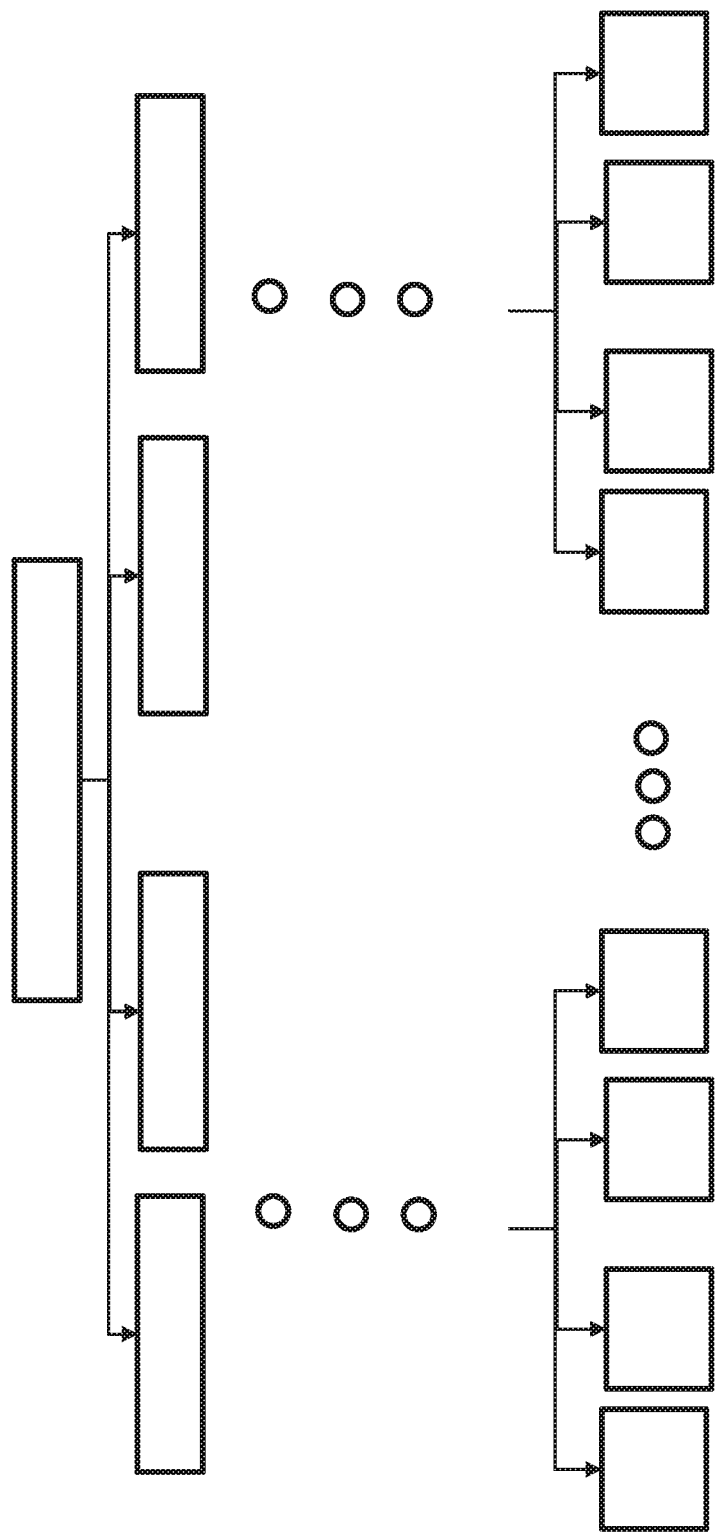
FIG. 5 is a logical diagram of an example tree data structure such as one that might be used in an application.

Attention is directed to FIG. 5, which illustrates a logical diagram of an example tree data structure such as one that might be used in an application.

The illustrated tree data structure might be a tree that is being traversed in a machine learning method (e.g. random forest).

Some applications (such as tree traversal) must make runtime decisions to branch or go-to (e.g. jump to a different part of code according to a conditional variable), there is a problem.

In some prior art implementations of branch based decisions using homomorphically-encrypted data, it is necessary to store all encrypted results of conditional variables in branch based decisions until decrypt time.

Keeping all results to be analyzed at decrypt time is inefficient: to traverse a tree/graph such as the one illustrated there is a need to evaluate all available conditional variables at each level of the tree—instead of just evaluating the descendents of the selected path at each level (i.e. the number of evaluations on the order or the log of the number of leaves).

In contrast, when performing the tree traversal machine only the needed comparisons are performed. The HE-enabled MOV machine 130 performs the same comparisons as the general case MOV machine i.e. the same logical operations are done at both machines (with the comparison operation itself replaced as described above).

Accordingly HE-enabled MOV machine 130 over tree/graph search domains (like AI) yields a number of comparison operations that is the same as the number of comparison operations at plain text.

In some embodiments, an application can be executed in a "hybrid scheme"—in which part of the application (e.g. tree traversal) is run in the HE-enable MOV machine, while another part of the application is run in another method or framework.

Figure 6:
FIG. 6 is a prior art method for performing comparison of two memory locations using only MOV.

Attention is now directed to FIG. 6, which illustrates a prior art method for performing comparison of two memory locations using only MOV.

The method performs comparison of 2 numbers which are stored in registers Ri and Rj. It is assumed here that both registers (Ri and Rj) contain the value "30".

The first operation is to move "0" to memory cell "30". The second operation is to move "1" to memory cell "30". The final operation is to move the value of memory cell "30" (which is "1") to register Rk.

Register Rk then holds the comparison's result which is "1" because the value of Ri equals the value of Rj. If Ri is "30" and Rj is "40" then "0" is moved to register Rk-indicating that the value of Ri ("30") is not equal to the value of Rj ("40").

Attention is now directed to FIGS. 7A and 7B, which illustrate alternatives used in an example method for performing comparison of two memory locations using only MOV.

Optionally: in some embodiments, HE-enabled MOV machine 130 supports a mode in which data are decrypted for processing, whereas the output HE data 135 is still encrypted. In such an embodiments, compare operation can be performed as shown in FIG. 7A—which in turn follows the scheme described above with reference to FIG. 6.

However, if instructions for the compare operation always follow the steps of FIG. 7A, an observer can easily discern which bit is the encrypted 0 and which is the encrypted 1 (by observing the memory locations to which the data is written, or by observing the order in which the data is written. Accordingly, in some embodiments of the currently disclosed subject matter, MOV machine application 120 can select (e.g. randomly select) either the MOV-based comparison of FIG. 7A or the MOV-based comparison of FIG. 7B.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of executing a program segment operating on homomorphically encrypted data, the method comprising:
   providing a processing and memory circuitry (PMC) configured to execute, responsive to a respective program instruction, at least:
   i) a move operation, and
   ii) an operation of comparing two homomorphically encrypted input bits, the operation giving rise to storage of an encrypted binary output digit to a memory location, in accordance with whether unencrypted bits corresponding to the encrypted input bits are equal;
   executing, on the PMC, a responsive to instructions of the program segment:
   i) a first operation of comparing two homomorphically encrypted bits to store a comparison result to a first memory location, and
   ii) a second operation that is configured to access the first memory location;
   causing execution of a program segment including only additive homomorphic instructions without performing branch or go-to operations and in accordance with the comparison result of the homomorphically encrypted bits.

2. The method of claim 1, wherein the operation of comparing is one-minus-XOR.

3. The method of claim 1, wherein the bits are homomorphically encrypted in accordance with Dijk, Gentry, Halevi and Vaikuntanathan (DGHV) encryption.

4. The method of claim 1, wherein the bits are homomorphically encrypted in accordance with Pailler encryption.

5. The method of claim 1, wherein the bits are homomorphically encrypted in accordance with DGHV and subsequently encrypted with in accordance with Pailler.

6. The method of claim 1, wherein the second operation is selected from a group comprising: the move operation, and the homomorphic comparison operation.

7. A system of executing a program segment operating on homomorphically encrypted data, the system comprising:
   a processing and memory circuitry (PMC) configured to execute, responsive to a respective program instruction, at least:
   i) a move operation, and
   ii) an operation of comparing two homomorphically encrypted input bits, the operation giving rise to storage of an encrypted binary output digit to a memory location, in accordance with whether unencrypted bits corresponding to the encrypted input bits are equal,
   the PMC comprising a program segment, the program segment comprising instructions to:
   i) execute a first operation of comparing two homomorphically encrypted bits to store a comparison result to a first memory location, and
   ii) execute a second operation that is configured to access the first memory location;
   causing execution of a program segment including only additive homomorphic instructions without performing branch or go-to operations and in accordance with the comparison result of homomorphically encrypted bits.

8. The system of claim 7, wherein the program segment comprises further instructions to:

i) move an encrypted 1 to a memory location denoted by a first register;
ii) move an encrypted 0 to a memory location denoted by a second register; and
iii) move the data contained in the memory location denoted by the second register to a comparison result memory location.

9. A computer program product comprising a computer readable non-transitory storage medium containing program instructions, which program instructions when read by a processor, cause the processor to perform a method of executing a software program operating on homomorphically encrypted data, the method comprising:
i) executing a first operation of comparing two homomorphically encrypted bits to store a comparison result to a first memory location, and
ii) executing a second operation that is configured to access the first memory location;
causing execution of a program segment including only additive homomorphic instructions without performing branch or go-to operations and in accordance with the comparison result of homomorphically encrypted bits,
wherein the executing is performed on a MOV machine emulation configured to execute, responsive to a respective MOV machine program instruction of a MOV machine program segment, at least:
i) a move operation, and
ii) an operation of comparing two homomorphically encrypted input bits, the operation giving rise to storage of an encrypted binary output digit to a memory location, in accordance with whether unencrypted bits corresponding to the encrypted input bits are equal.

* * * * *